United States Patent
Breitfelder et al.

(10) Patent No.: US 6,658,306 B2
(45) Date of Patent: Dec. 2, 2003

(54) ELECTRONIC CONTROL DEVICE FOR INTEGRATION INTO MECHANICAL SYSTEMS

(75) Inventors: Markus Breitfelder, Regensburg (DE); Peter Fischer, Aschaffenburg (DE); Günther Horsak, Meckenbeuren (DE)

(73) Assignee: Siemens Aktiengesellschaft, Munich (DE)

(*) Notice: Subject to any disclaimer, the term of this patent is extended or adjusted under 35 U.S.C. 154(b) by 93 days.

(21) Appl. No.: 10/053,065

(22) Filed: Jan. 17, 2002

(65) Prior Publication Data

US 2002/0095227 A1 Jul. 18, 2002

(30) Foreign Application Priority Data

Jan. 17, 2001 (DE) .......................................... 101 01 974

(51) Int. Cl.[7] .............................................. G05B 19/42
(52) U.S. Cl. ...................................................... 700/86
(58) Field of Search ............................... 700/86, 18–20, 700/1, 3, 275

(56) References Cited

U.S. PATENT DOCUMENTS

| 6,341,239 | B1 | * | 1/2002 | Hayashi et al. ................. 700/79 |
| 6,502,001 | B1 | * | 12/2002 | Kurono et al. ................. 700/86 |
| 6,580,953 | B1 | * | 6/2003 | Wiebe et al. ................... 700/86 |
| 2002/0170051 | A1 | * | 11/2002 | Watanabe et al. ............ 717/168 |

* cited by examiner

Primary Examiner—Paul P. Gordon
Assistant Examiner—Ronald D Hartman, Jr.
(74) Attorney, Agent, or Firm—Laurence A. Greenberg; Werner H. Stemer; Ralph E. Locher

(57) ABSTRACT

An electronic control device for integration into mechanical systems is described and provided with an operating program hierarchically broken down into a plurality of program levels. Some of the program levels are non-reprogrammable and some are reprogrammable. In this manner the flexibility of the electronic control device is greatly enhanced.

12 Claims, 1 Drawing Sheet

ELECTRONIC CONTROL DEVICE FOR INTEGRATION INTO MECHANICAL SYSTEMS

BACKGROUND OF THE INVENTION

FIELD OF THE INVENTION

The invention relates to an electronic control device for integration into a mechanical system. Electronic control devices of this type have as basic modules a microprocessor-supported central unit, a data memory, a program memory, containing an operating program, and interfaces for communicating with programming and data input devices and also with the mechanical system to be controlled.

With respect to the background of the invention, it should be noted that the use of electronic, microprocessor-based controllers in mechanical systems is becoming increasingly widespread. The functions of the electronic controller for operating the mechanical system are in this case essentially stored in the control device as the operating program.

"Integrated controllers", as they are known, in which the electronic control device is integrated directly into the mechanical system, are being used to an increasing extent. In this case, only a small number of interfaces for external communication are led to the outside, via which the freely programmable parameters of the controller, present in a limited number, can be set and varied.

Specifically when such integrated controllers are used in large numbers, it is endeavored for reasons of efficiency and because of the resulting cost advantages in development, production and product logistics, to use as far as possible the same electronic components for different, sufficiently similar tasks. The different requirements for the functional mode are then realized exclusively by a task-specific, application-oriented program variant.

Precisely this procedure presents a problem, however, in the case of integrated controllers in conjunction with program structures which are currently customary and used in practice, to the extent that the electronic control device is inflexibly assigned a function variant by the programming of the control device with fixed operating software in the production sequence. The control device is subsequently fitted in a "mechanical environment", such as for example installed in a transmission, with only the defined external interfaces being led to the outside. Although these can be used to carry out a programming/reprogramming of the actual operating program in accordance with a variant-specifically established method by use of the basic software, changing the basic software itself in a controller that is integrated into a mechanical module, and the associated establishment of a reprogramming method, are no longer possible. Once a function variant has been assigned, it is consequently no longer reversible. The irreversible assignment of a function variant then results in, however, that the installation of the controller implementing the function variant into a specific mechanical module virtually makes the latter become a specific type of device, which differs from a mechanical module with a control device using other basic software. If the mechanical modules with the respective electronic control device are considered as a whole, there are consequently different device variants that can no longer be changed over the product lifetime of the device.

SUMMARY OF THE INVENTION

It is accordingly an object of the invention to provide a electronic control device for integration into mechanical systems which overcomes the above-mentioned disadvantages of the prior art devices of this general type, in which a reversible variant-specific assignment is possible by the operating program during the product lifetime of an integrated controller.

With the foregoing and other objects in view there is provided, in accordance with the invention, an electronic control device for integration into a mechanical system. The electronic control device contains a microprocessor-supported central unit, a data memory connected to the central unit, an interface for communicating with programming and data input devices and also with the mechanical system to be controlled. The interface is connected to the central unit, and a program memory containing an operating program is connected to the central unit. The operating program is hierarchically subdivided into a plurality of program levels including: a basic control program for controlling basic functions in conjunction with the mechanical system to be controlled and is reprogrammable; a permanently installed, nonreprogrammable core control program for controlling a basic programmability of the electronic control device using the basic control program; and a device-specific function control program for controlling individual functions of the mechanical system fitted with the electronic control device and is likewise reprogrammable.

The object is achieved by the hierarchical breakdown of the operating program into a plurality of program levels. Accordingly, the breakdown provides a permanently installed, non-reprogrammable core control program, which controls the basic programmability of the control device by a basic control program; the aforementioned basic control program, which controls basic functions in conjunction with the mechanical system to be controlled and is reprogrammable; and a device-specific function control program, which controls the individual functions of the mechanical system fitted with the electronic control device and is likewise reprogrammable.

The invention consequently provides a program which can be changed over the product lifetime and, on account of this property it can be regarded in product characterization and logistics as a hardware component, that is as "firmware". The core control program then preferably establishes over an established communication interface that the control device can be programmed and reprogrammed in a defined way.

To this extent, on the basis of the core control program, the control device can be equipped with a further program, that is the basic control program, by which a specific function variant of the control device can be established in a specific way for the later user of the integrated controller. Preferably the variant-specific functions by which a reprogramming of the function controller program takes place in the defined way according to the respective variant are included in the basic control program. The process of the programming of the basic control program is in this case completely reversible, using the core control program, so that an entirely flexible function assignment for the electronic control device and the integrated controller provided with it is obtained over the product lifetime.

Finally, the reprogrammability of the actual device-specific function control program provides further flexibility. The hierarchical intermediate level of the basic control program allows the reprogramming to be achieved here by a user-specific communication method established by the basic control program.

To sum up, the central advantage of the invention lies in the at all times reversible function assignment of the control device, even in the case of integrated controllers. In this case, variants that do not even exist at the time when the device is produced but are developed later can also be subsequently programmed in, which additionally ensures the flexibility and extensively variable usability of the control device over its product lifetime.

In accordance with an added feature of the invention, the basic general initialization functions, functions for communication via a standard protocol and basic programming functionalities are implemented in the non-reprogrammable core control program.

In accordance with an additional feature of the invention, the functions for communication via user-specific protocols and/or user-specific reprogramming functionalities are implemented in the basic control program.

In accordance with another feature of the invention, the non-reprogrammable core control program is programmed in before the electronic control device is installed into the mechanical system being a user specific mechanical system.

In accordance with a further feature of the invention, depending on user-specific requirements, the basic control program can be programmed in before or after the electronic control device is installed into the mechanical system.

In accordance with a concomitant feature of the invention, the device-specific function control program is programmed in after the electronic control device is installed into the mechanical system.

With the foregoing and other objects in view there is provided, in accordance with the invention, a method for programming an electronic control device to be integrated into a mechanical system. The electronic control device has a microprocessor-supported central unit, a data memory connected to the central unit, an interface for communicating with programming and data input devices and also with the mechanical system to be controlled, and a program memory connected to the central unit. The method includes the step of programming the program memory with an operating program. The operating program is hierarchically subdivided into a plurality of program levels including a basic control program for controlling basic functions in conjunction with the mechanical system to be controlled and is reprogrammable, a permanently installed, nonreprogrammable core control program for controlling a basic programmability of the electronic control device using the basic control program, and a device-specific function control program for controlling individual functions of the mechanical system fitted with the electronic control device and is likewise reprogrammable.

Other features which are considered as characteristic for the invention are set forth in the appended claims.

Although the invention is illustrated and described herein as embodied in a electronic control device for integration into mechanical systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
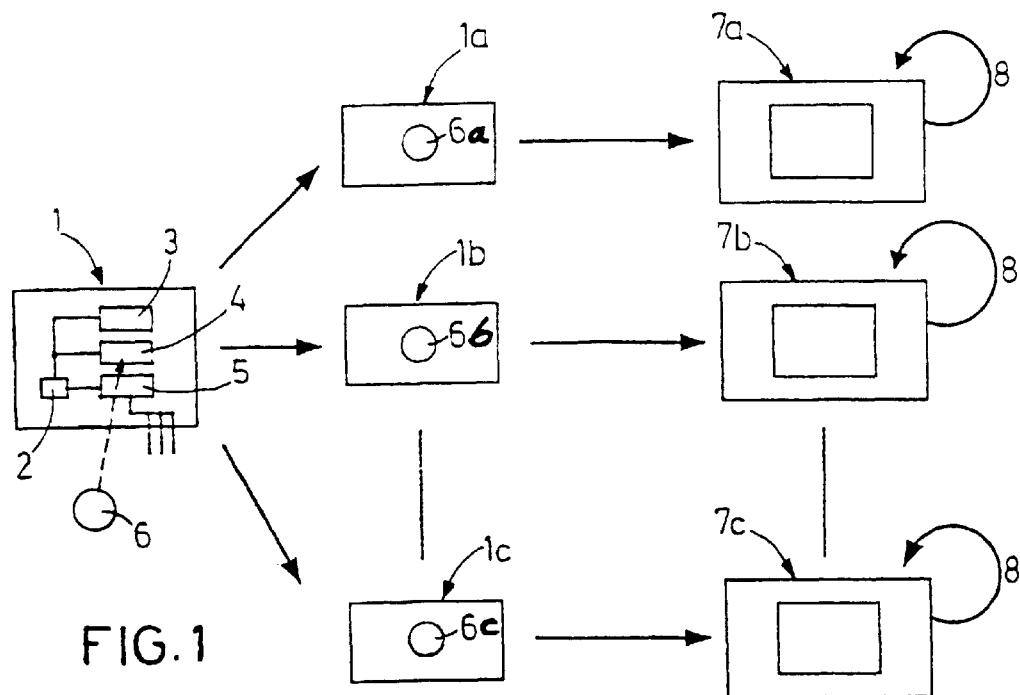
FIG. 1 is a block diagram of a product lifecycle of a conventional electronic control device.

Referring now to the figures of the drawing in detail and first, particularly, to FIG. 1 thereof, there is shown a flow diagram depicting a conventional product lifecycle according to the prior art. This is based on an electronic control device 1, which is provided with a microprocessor-supported central unit 2, a data memory 3, a program memory 4 and interfaces 5 for communicating with external programming and data input devices, not represented in any more detail, and also with the mechanical system to be controlled. During a production of an integrated controller, such an electronic control device 1 is fed with a specific user-specific and function-specific operating program with the variants 6a, 6b, 6c via the interfaces 5, whereby the electronic control device 1 becomes a respectively specific control device 1a 1b, 1c. The control device is installed into a corresponding mechanical module 7a, 7b or 7c. The corresponding integrated controller consequently has a quite specific functionality profile, which can be varied only within limited function parameters. The corresponding reprogramming steps are indicated by arrows 8 in FIG. 1.

Figure 2:
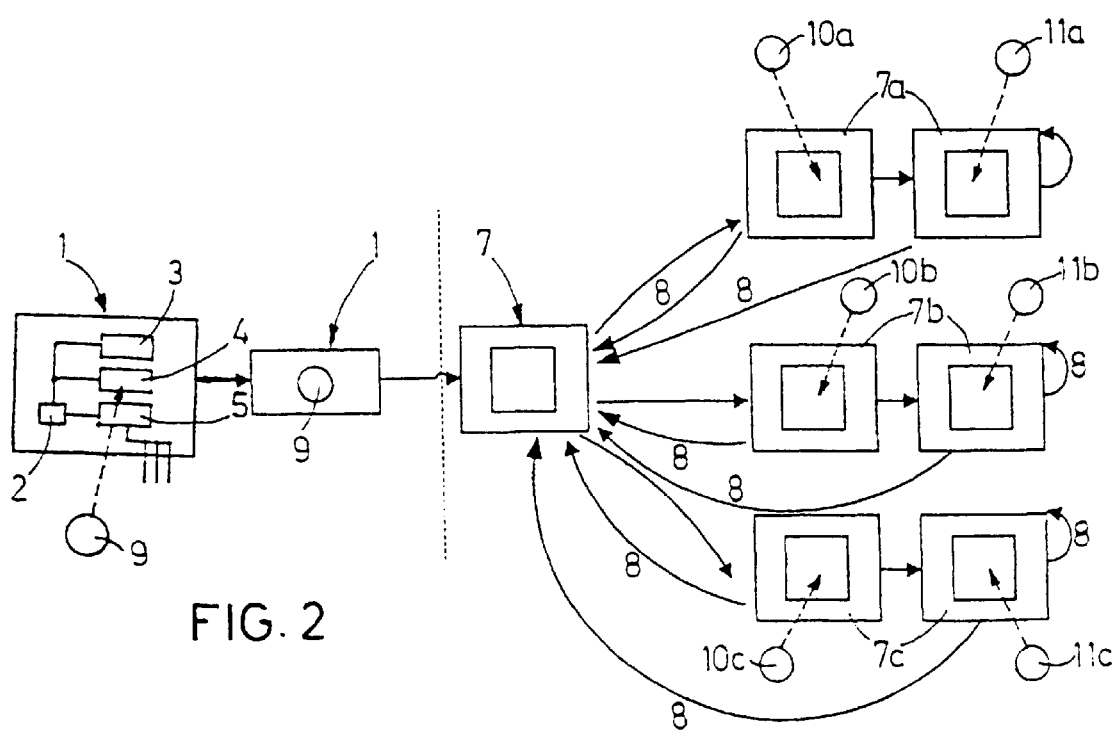
FIG. 2 is a block diagram of a product lifecycle of an electronic control device provided with a hierarchically broken-down operating program according to the invention.

To explain the invention, reference is now made to FIG. 2. This is again based on the electronic control device 1, which has the central unit 2, the data memory 3 and the program memory 4. During the production of the control device 1, an irreversible process is used to program in a core control program 9, which can no longer be changed over the product lifetime. The software is essentially given the basic, general initialization functions, the functions for communicating via a standard protocol and additional programming functionalities. The standard protocol is in this case independent of the variant and the user. The control device 1 provided with the core control program 9 is universally usable and consequently to be regarded as an identical part.

At the premises of the user, such as for example the manufacturer of a mechanical system, a basic control program 10a, 10b or 10c is then stored in the control device 1 with the aid of the core control program 9. The basic control program 10 is application-specific and function-specific and essentially contains the functions for communication via user-specific protocols and user-specific reprogramming functionalities, such as changes in the actual operating program and the storage of adjustment and historical data.

Different electronic control devices 1a, 1b, 1c may then in each case be given different device-specific function control programs application-specifically with the aid of the respective basic control program 10a, 10b, 10c, so that when the respective electronic control device 1a, 1b, 1c has been installed into mechanical systems different mechanical modules 7a, 7b, 7c are obtained in each case.

The properties of the modules 7a, 7b, 7c are then able to be changed with great variability. For instance—as already in the prior art—each mechanical module 7a, 7b, 7c may be provided with a new device-specific function control program 11a, 11b, 11c with the aid of the basic control program, so that the module can be changed to changed control functions, such as sensor signal processing, activation of the actuators, open-loop and closed-loop control functions, driving strategy and diagnosis management in the case of motor vehicle transmissions—as an example of the mechanical module 7.

In addition, it is possible with the aid of the core control program 9 also to change the basic control program 10, so that the latter is reversible and fully flexibly reprogrammable on this level. Therefore, the mechanical module 7b or 7c can be made out of the mechanical module 7a in the course of the product lifetime by reprogramming. To this extent, for example, modules returned from field trials can be assigned completely new intended uses.

A transmission may be taken as an example of the mechanical module. In this connection, a manufacturer competent in the electrotechnical field then produces the electronic control devices 1 and programs into them only the core control program 9. The identical hardware parts created in this way are delivered to a transmission manufacturer, which fits out the transmissions manufactured by it with corresponding control devices and sells them to various automobile manufacturers. Since the automobile manufacturers impose extremely different requirements on the functionality of the "transmission" as an integrated control system, this gives rise to different variants, which have an influence on the control program, including its control data. Similarly, the automobile manufacturers define their own communication standards for reprogramming.

To allow for the above circumstances, it is possible in the case of the reprogramming structure according to the invention that the transmission manufacturer programs in or correspondingly reprograms a basic control program corresponding to the respective requirements in each identical part, on the basis of the core control program 9. At a later point in time, new variants of the basic control program and of the associated function control program can then be added by the reprogramming possibility, without the core control program 9 having to be modified.

To sum up, on account of the continuity of the use of identical parts in the production lifetime of the electronic control device 1, considerable advantages are obtained both for the manufacturer of the control device 1 and for the manufacturer of the respective mechanical system with respect to development, production and product logistics.

We claim:

1. An electronic control device for integration into a mechanical system, the electronic control device comprising:
    a microprocessor-supported central unit;
    a data memory connected to said central unit;
    an interface for communicating with programming and data input devices and also with the mechanical system to be controlled, said interface connected to said central unit; and
    a program memory containing an operating program and connected to said central unit, the operating program being hierarchically subdivided into a plurality of program levels including:
        a basic control program for controlling basic functions in conjunction with the mechanical system to be controlled and is reprogrammable;
        a permanently installed, nonreprogrammable core control program for controlling a basic programmability of the electronic control device using the basic control program; and
        a device-specific function control program for controlling individual functions of the mechanical system fitted with the electronic control device and is likewise reprogrammable.

2. The control device according to claim 1, wherein basic general initialization functions, functions for communication via a standard protocol and basic programming functionalities are implemented in said non-reprogrammable core control program.

3. The control device according to claim 1, wherein functions for one of communication via user-specific protocols and user-specific reprogramming functionalities are implemented in said basic control program.

4. The control device according to claim 1, wherein said non-reprogrammable core control program is programmed in before the electronic control device is installed into the mechanical system being a user specific mechanical system.

5. The control device according to claim 1, wherein, depending on user-specific requirements, said basic control program can be programmed in before or after the electronic control device is installed into the mechanical system.

6. The control device according to claim 1, wherein said device-specific function control program is programmed in after the electronic control device is installed into the mechanical system.

7. A method for programming an electronic control device to be integrated into a mechanical system, the electronic control device having a microprocessor-supported central unit, a data memory connected to the central unit, an interface for communicating with programming and data input devices and also with the mechanical system to be controlled, and a program memory connected to the central unit, which comprises the steps of:
    programming the program memory with an operating program, the operating program being hierarchically subdivided into a plurality of program levels including a basic control program for controlling basic functions in conjunction with the mechanical system to be controlled and is reprogrammable, a permanently installed, nonreprogrammable core control program for controlling a basic programmability of the electronic control device using the basic control program, and a device-specific function control program for controlling individual functions of the mechanical system fitted with the electronic control device and is likewise reprogrammable.

8. The method according to claim 7, which comprises implementing basic general initialization functions, functions for communication via a standard protocol and basic programming functionalities in the non-reprogrammable core control program.

9. The method according to claim 7, which comprises implementing functions for one of communication via user-specific protocols and user-specific reprogramming functionalities in the basic control program.

10. The method according to claim 7, which comprises programming the non-reprogrammable core control program before the electronic control device is installed into the mechanical system.

11. The method according to claim 7, which comprises programming the basic control program in before or after the electronic control device is installed into the mechanical system in dependence on user-specific requirements.

12. The method according to claim 7, which comprises programming the device-specific function control program after the electronic control device is installed into the mechanical system.

* * * * *

UNITED STATES PATENT AND TRADEMARK OFFICE
CERTIFICATE OF CORRECTION

PATENT NO. : 6,658,306 B2
DATED : December 2, 2003
INVENTOR(S) : Markus Breitfelder et al.

It is certified that error appears in the above-identified patent and that said Letters Patent is hereby corrected as shown below:

<u>Title page,</u>
Item [73], Assignee, should read as follows:

-- Siemens Aktiengesellschaft, München (DE),
 ZF Friedrichshafen AG, Friedrichshafen (DE) --

Signed and Sealed this

Twenty-third Day of March, 2004

JON W. DUDAS
*Acting Director of the United States Patent and Trademark Office*